C. R. RAGSDALE.
PLURAL STREAM DISTRIBUTING ATTACHMENT FOR SODA WATER DRAFT ARMS.
APPLICATION FILED MAY 4, 1921.
1,408,397. Patented Feb. 28, 1922.
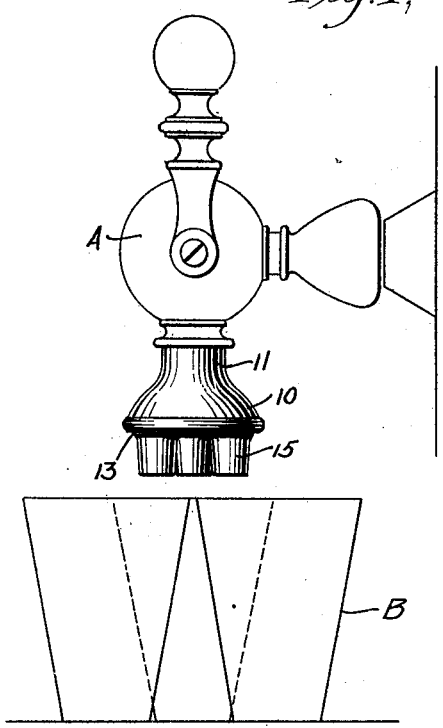
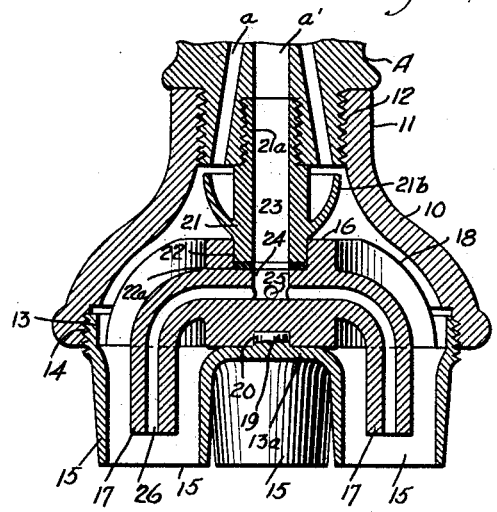
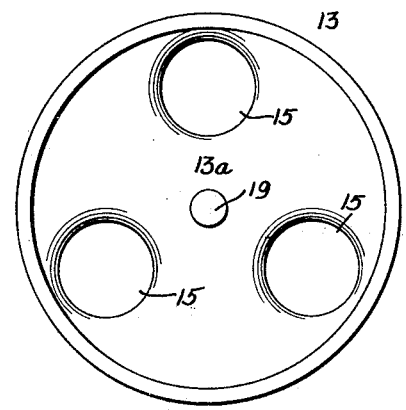
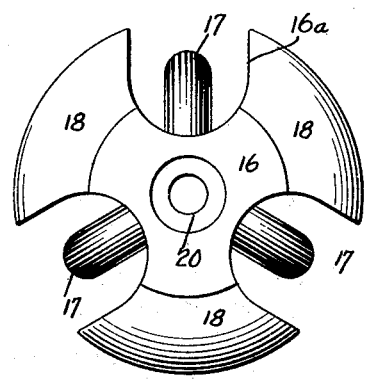
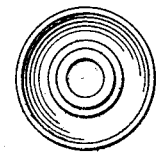
WITNESSES
Edw. Thorpe
INVENTOR
C. R. Ragsdale
BY Munn & Co
ATTORNEYS

UNITED STATES PATENT OFFICE.

CHARLES REED RAGSDALE, OF ST. LOUIS, MISSOURI.

PLURAL-STREAM-DISTRIBUTING ATTACHMENT FOR SODA-WATER DRAFT ARMS.

1,408,397.  Specification of Letters Patent.  Patented Feb. 28, 1922.

Application filed May 4, 1921. Serial No. 466,721.

*To all whom it may concern:*

Be it known that I, CHARLES REED RAGSDALE, a citizen of the United States, and a resident of the city of St. Louis and State of Missouri, have invented a new and Improved Plural-Stream-Distributing Attachment for Soda-Water Draft Arms, of which the following is a description.

My invention relates to soda water fountains and especially to the draft arm through which the soda water is drawn.

The present invention is intended more particularly as an improvement on the distributing attachment forming the subject matter of Letters Patent No. 1374767 granted to me on April 12, 1921.

In common with the attachment disclosed in the above-named application, the general object of the present invention is to provide a novel attachment to be applied to the draft arm in lieu of the usual hard rubber nozzle, and so arranged as to produce speedy service, the attachment providing a plurality of distributing members having nozzles and preferably three in number set in triangular relation to permit of the operator filling either one, two, or three glasses at a time. The attachment provides for drawing therefrom both the plural coarse streams and plural fine streams or sprays and by the usual operation of the ordinary controlling handle of the draft arm. In common also with the prior attachment disclosed in the mentioned application the present invention provides, and in a novel manner, for establishing connection between the fine spray nozzles and the fine spray passage of the draft arm by the securing of the head and coarse spray nozzles to the draft arm.

The especial object of the present invention is to provide a novel form of the head with its plural coarse stream nozzles as well as a separate distinctive element embodying the fine spray nozzles novel in itself and in its relation to the coacting elements for clamping said element detachably in position, looking to convenience of manufacture and the facility of assemblage or disassembling as well as to provide for the effective control of the respective streams.

The nature of the invention, its advantages and distinctive features will more clearly appear as the description proceeds.

Reference is to be had to the accompanying drawings forming a part of this specification, it being understood that the drawings are merely illustrative of one example of the invention.

Figure 1 is a side elevation of a draft arm having my approved attachment applied thereto;

Figure 2 is an enlarged vertical section of the attachment and fragment of the draft arm;

Figure 3 is a plan view of the detachable member of the head provided with the coarse stream nozzles;

Figure 4 is a plan view of the fine spray element;

Figure 5 is a plan view of a fitting for factoring in the holding of the fine spray element in position for establishing communication between the fine spray element of the attachment and the fine stream passage of the draft arm.

In carrying out my invention in accordance with the illustrated example I provide a body or head 10 having a reduced upper end or neck 11 arranged to connect by threads 12 thereon, either externally or internally with the draft arm according to the particular arrangement of the threads on said draft arm. It is to be understood that the attachment takes the place of the usual nozzle found on the draft arm A of ordinary fountains. On the lower flared end of the head 10 is a detachable member 13 having a threaded connection with the head as at 14 and provided with a plurality of depending coarse stream nozzles 15 so that when the body 10 is secured to the draft arm said nozzles 15 will be in communication with the coarse stream passage or passages *a* of the draft arm.

The member 13 of the head 10 presents a seat surface 13ª centrally thereof between the nozzles 15, said seat being adapted to receive a separate fine spray element 16 having advantageously in practice the form of a casting having integral depending fine spray nozzles 17 and radial wings 18 in staggered relation to the nozzles 17, there being openings 16ª presented between said wings in line with the nozzle 17 for the course stream down-flow to the nozzles 15. Centrally of the seat surface 13ª is an upstanding protuberance 19 which is received in a corresponding recess 20 in the element 16 at the under side, said under side being adapted to rest on the seat 13ª.

For holding the fine spray element 16 to its seat and for establishing communication between the nozzles 17 of said element 16 and the fine spray passage a' of draft arm A I provide an interior fitting 21, the lower end of which is receivable in a socket or depression 22 in the top of the fine spray element 16, the arrangement effecting a slip connection between the fitting 21 and the fine spray element 16. In practice a washer or packing ring 22a is employed in the bottom of the recess 22. The fitting 21 has a through-bore 23 which establishes communication between the fine spray passage a' of draft arm A and a blind bore 24 in the element 16 and extending downwardly from the bottom of the socket 22. From the vertical bore 24 of fine spray element 16 at the bottom thereof lead outlet ports 25 communicating with the passages 26 of the respective fine spray nozzles 17. The arrangement is such that the fine stream may freely flow from the passage a' of the draft arm A downwardly through bore 23 of fitting 21 and blind bore 24 to ports 25 and nozzle passages 26, while the coarse stream from the passages a may flow about the fitting 21 and downwardly between the wings 18 of the fine spray fitting 16 to the nozzles 15. The fitting 21 is detachably connected with the lower end of the draft arm A by a threaded nipple 21a on said fitting taking into an internally threaded socket in the draft arm. On the fitting 21 is a cup-shaped annular flange extending about said fitting to break up the coarse stream. Nozzle element 13 with fine spray element 16 seated thereon may be readily unscrewed from the draft arm while leaving the fitting 21 on said draft arm as an appurtenance thereof and in effect a continuation of the fine spray pipe of the draft arm. The replacing of the head 10 on the draft arm will again effect connection between the fine spray element 16 and the lower end of the fitting 21 to establish the fine spray and coarse stream connections with the draft arm, or head 10 with elements 13 and 16 may be attached and detached.

In use as fully explained in my aforenamed patent, tumblers, glasses, or other drinking receptacles B may be filled either one glass, two glasses, or three glasses. This is so because the three nozzles 15 may be disposed above a single glass, two of said nozzles may be disposed above one glass, while the third nozzle is disposed above a second glass or a separate glass may be disposed beneath each of the nozzles 15.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:

1. A plural distributing attachment for a soda fountain draft arm, comprising a head adapted at its upper end for connection with the draft arm to receive a coarse stream, said head having a plurality of depending coarse stream nozzles, a separate fine spray element seating within said head at the bottom thereof and having a plurality of spray nozzles extending respectively therefrom into said coarse stream nozzles and spaced from the latter to allow the coarse stream flow, and an internal fitting above said fine spray element and having means to connect it with the fine stream passage of the draft arm, said fine spray element being detachably held between its seat and said fitting.

2. A plural distributing attachment for a soda fountain draft arm, comprising a head adapted at its upper end for connection with the draft arm to receive a coarse stream, said head having a plurality of depending coarse stream nozzles, a separate fine spray element seating within said head at the bottom thereof and having a plurality of spray nozzles extending respectively therefrom into said coarse stream nozzles and spaced from the latter to allow the coarse stream flow, and means serving to detachably hold said element to its seat and establish communication between said element and the fine stream passage of the draft arm.

3. A plural distributing attachment for a soda fountain draft arm, comprising a head adapted at its upper end for connection with a draft arm to receive a coarse stream, said head having a plurality of depending coarse stream nozzles, a separate fine spray element seating within said head at the bottom thereof and having a plurality of spray nozzles extending into said coarse stream nozzles and spaced from the latter to allow coarse stream flow, and a fitting in said head adapted for connection with the draft arm at the fine stream passage thereof and serving to engage said fine spray element for holding the same in position and for establishing communication between said element and said fine stream passage of the draft arm.

4. A plural distributing attachment for a soda fountain draft arm, comprising a head adapted at its upper end for connection with a draft arm to receive a coarse stream issuing therefrom, said head having a plurality of depending coarse stream nozzles, a separate fine spray element seating within said head at the bottom thereof and having a plurality of spray nozzles extending into said coarse stream nozzles and spaced from the latter to allow the coarse stream flow, and a fitting having means at its upper end to detachably secure it to the draft arm at the fine stream passage of the latter, said fitting at its lower end having a slip connection with said fine spray element holding the latter in position and serving to establish communication between said fine spray fitting and the fine stream passage of the draft arm.

5. A plural distributing attachment for a soda fountain draft arm, comprising a head adapted at its upper end for connection with the draft arm to receive the coarse stream, said head having a plurality of depending coarse stream nozzles, a separate fine spray element in said head and having support thereon, said element being provided with a plurality of spray nozzles directed downwardly to discharge through the coarse stream nozzles, and a separate fitting having means at its upper end to secure it to the draft arm at the fine stream passage thereof, to constitute an appurtenance of the draft arm, said fine spray element being adapted to form a slip connection with said fitting and the latter affording a passage for the flow of the fine stream to said element.

6. A plural distributing attachment for a soda fountain draft arm, including a head having means to connect it with the draft arm for receiving the coarse stream therefrom and having a plurality of depending coarse stream nozzles, a separate fine spray element supported by said head having a plurality of spray nozzles extending downwardly to discharge through the coarse stream nozzles, and a separate fitting accommodated in said head above said element and affording flow therethrough from the fine stream passage of the draft arm to said fine spray element.

7. A plural distributing attachment for a soda fountain draft arm including a head adapted at its upper end adapted for connection with a draft arm and provided with a plurality of coarse stream nozzles, a separate fine spray element having support on said head in the lower portion thereof and provided with spray nozzles discharging through the coarse spray nozzles, and a fitting having a slip connection at its lower end with said element and having means at its upper end to connect it with the draft arm at the fine stream passage thereof, said fitting affording a passage between the draft arm and said element for the fine stream flow.

8. A plural distributing attachment for a soda fountain draft arm including a head adapted at its upper end for connection with a draft arm and provided with a plurality of coarse stream nozzles, a separate fine spray element having support on said head in the lower portion thereof and provided with spray nozzles discharging through the coarse spray nozzles, said element having lateral wings spaced for the flow of the coarse stream therebetween, and means to detachably hold said element in position and afford flow for the fine stream from the draft arm to said element.

9. A plural distributing attachment having means to attach it to a soda fountain draft arm, a head having a detachable element at its lower end formed with a plurality of coarse stream nozzles, said element affording a seat thereon within the head, a separate fine spray element supported on said seat, and means to connect said fine spray element with the draft arm at the fine stream passage thereof.

10. A plural distributing attachment having means to attach it to a soda fountain draft arm, a head having a detachable element at its lower end formed with a plurality of coarse stream nozzles, said element affording a seat thereon within the head, a separate fine spray element supported on said seat, and means to connect said fine spray element with the draft arm at the fine stream passage thereof, said seat having a centering protuberance and the fine spray element having a recess to accommodate the same.

CHARLES REED RAGSDALE.